Oct. 23, 1934.  B. BOGOSLOWSKY  1,978,074
APPARATUS FOR MAKING COFFEE
Filed Oct. 12, 1932   3 Sheets-Sheet 1
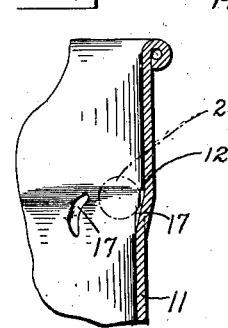
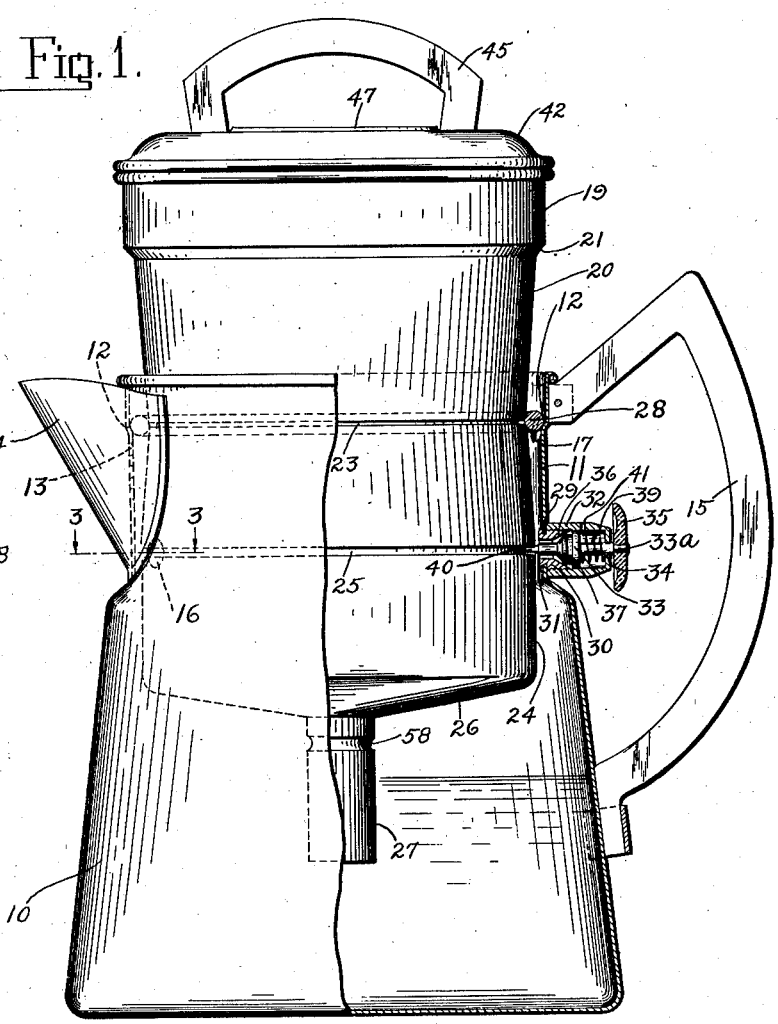
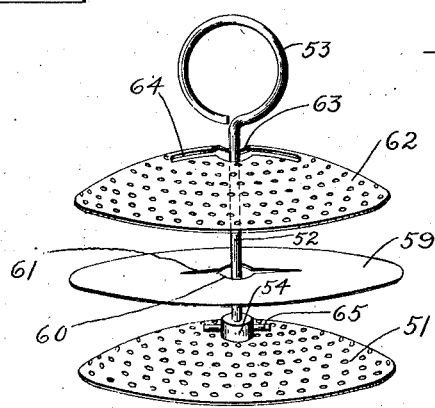
Inventor
Boris Bogoslowsky
By
Attorney Oct. 23, 1934.  B. BOGOSLOWSKY  1,978,074
APPARATUS FOR MAKING COFFEE
Filed Oct. 12, 1932  3 Sheets-Sheet 2
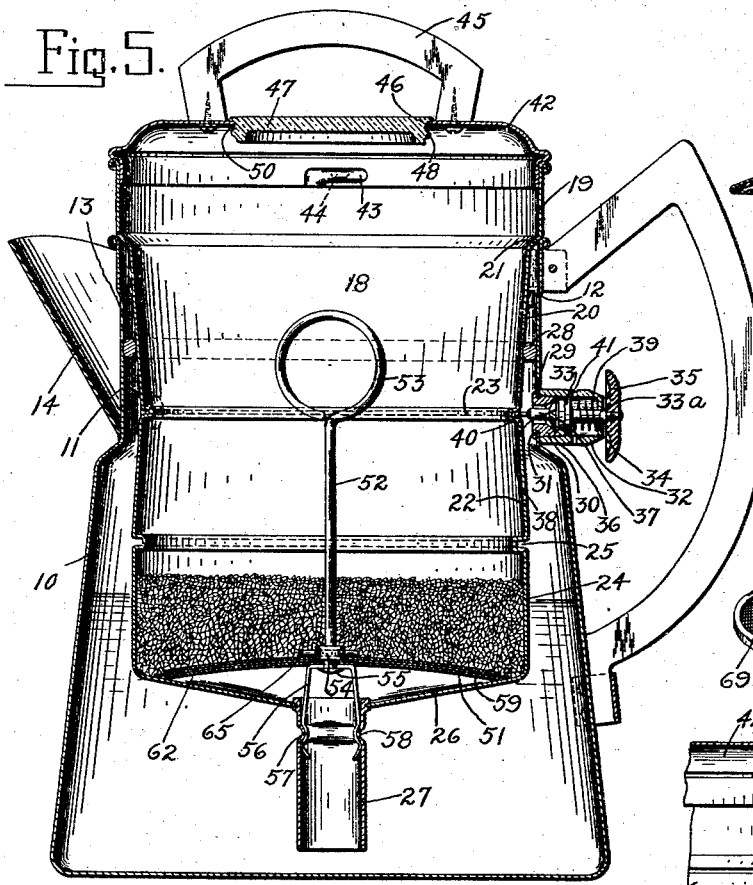

Oct. 23, 1934.                B. BOGOSLOWSKY                1,978,074
                            APPARATUS FOR MAKING COFFEE
                            Filed Oct. 12, 1932        3 Sheets-Sheet 3

INVENTOR.
Boris Bogoslowsky
BY
ATTORNEY

Patented Oct. 23, 1934

1,978,074

UNITED STATES PATENT OFFICE 1,978,074

APPARATUS FOR MAKING COFFEE

Boris Bogoslowsky, Bridgeport, Conn., assignor, by mesne assignments, to Arnold C. Dickinson, Fitchburg, Mass.

Application October 12, 1932, Serial No. 637,457

33 Claims. (Cl. 53—3)

The present invention relates to improvements in coffee making apparatus, particularly of the type in which a coffee container is adapted to be used in connection with a pressure sealed water container, and wherein the water is adapted when it reaches a boiling point to produce pressure which forces it into the coffee container, from which it passes back into the water container as coffee solution when the pressure therein is reduced. Apparatus of this type at present on the market consists of a lower container having a reduced neck into which a depending funnel provided on an upper container is inserted and sealed by an air-tight joint. These containers are usually of glass, and are not only subject to breakage, but are complicated and inconvenient to manipulate, difficult to clean, and can not be readily and economically manufactured by casting, stamping, molding or other modern quantity production methods, either from glass or from other more durable materials, such as metal and enameled iron.

Difficulty was also experienced in maintaining a proper and effective seal, while at the same time providing a device which could be operated with ease and without the necessity for careful and skillful adjustment and manipulation of the cooperating parts. Also such previous devices were clumsy and difficult to handle, and required the complete separation of the cooperating parts in order to pour the coffee solution.

An object of the present invention is to provide an apparatus in which all of the parts are of such form that they may be easily and thoroughly cleaned, and which may be economically manufactured from any desired material, and in particular may be cast, pressed, drawn or spun from metal. A further object is to provide an apparatus in which the sealing means may be operated to provide an effective seal, with very little effort or skill on the part of the user. Another object is to provide an apparatus which will not necessitate the complete separation of the parts in order to pour the coffee solution.

In the drawings:

Fig. 1 is a side elevation, partly broken away and in vertical cross-section, of a coffee making apparatus, according to one embodiment of the invention, and showing the same in one of its operative positions, i. e., its unsealed position with the coffee container raised.

Fig. 2 is an enlarged fragmentary detail sectional view along the line 2—2 of Fig. 6, and showing air-vent means employed.

Fig. 3 is a fragmentary detail sectional view taken along the line 3—3 of Fig. 1.

Fig. 4 is a perspective view showing the drainer and filter means employed, the parts being shown in separated relation.

Fig. 5 is a vertical sectional view of the coffee making apparatus, and showing the same in its sealed operative position, the coffee container being lowered.

Fig. 6 is a plan view, partially broken away.

Fig. 7 is a sectional view of a modified form of drainer and filter, in which the filter is of finely woven cloth.

Fig. 8 is a perspective view, partially broken away, of a further modified form of drainer and filter, in which the filter is of very fine wire mesh.

Fig. 9 is a vertical sectional view, partially broken away, of a modified form of the invention, the same being shown in its sealed position, the coffee container being lowered.

Similar reference characters indicate corresponding parts throughout the several figures of the drawings.

Figure 10:
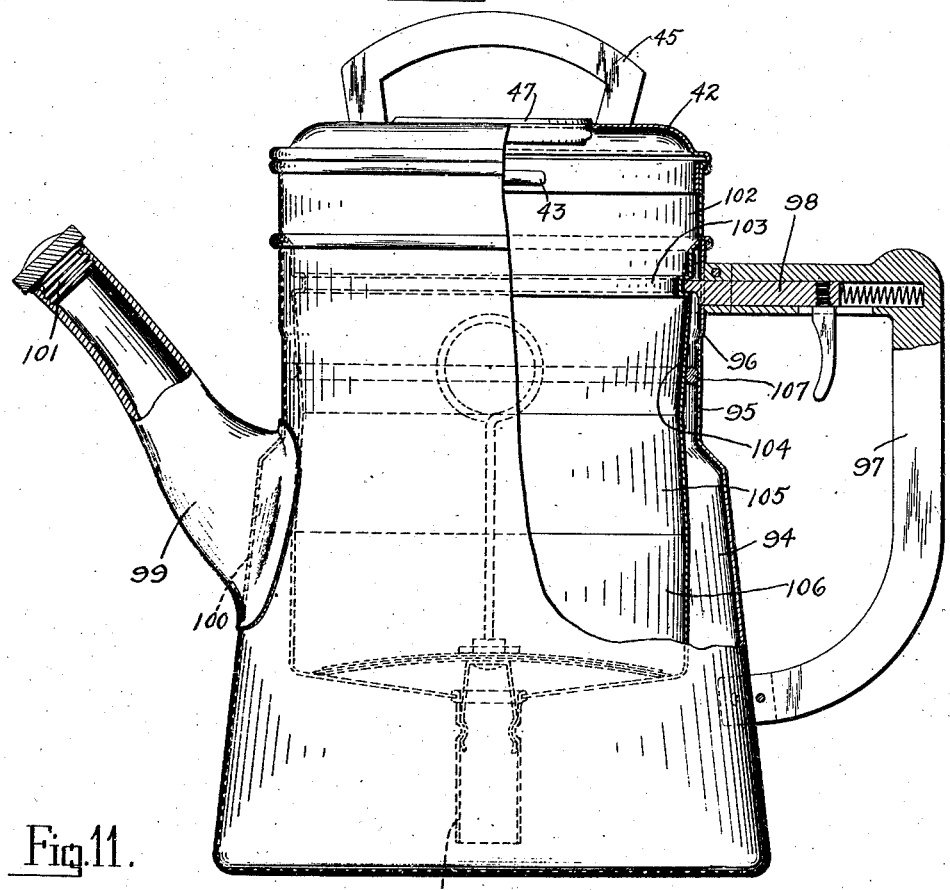
Fig. 10 is a side elevation, partially broken away, and in vertical section, of a further modified form of the invention.

Referring to Figs. 1 to 6 of the drawings, the coffee making apparatus, according to the exemplary embodiment of the invention disclosed therein, comprises a water container 10 provided below its upper edge with a slightly contracted cylindrical band portion 11, forming upon the interior of the container an annular cylindrical seating portion having an annular shoulder 12 at its upper end. Pouring openings 13 are provided in the portion 11 at a point substantially above the lower end, and a pouring spout 14 is arranged about these openings. A handle 15 is secured in any suitable manner at the opposed side of the container from the spout. A pair of projections or bosses 16, which may be in the form of rivet heads, as shown, or may be pressed into the metal as will be obvious, are provided near the lower edge of the portion 11 in spaced relation at each side of the pouring spout, and are adapted, as will hereinafter more fully appear, to centrally position the coffee-grounds-container in its raised position in spaced relation to the surface of the portion 11. The shoulder 12 is provided at one or more points contiguous to the handle side of the container with indentations 17 which provide air-vent means when the sealing ring is in place upon the shoulder to permit passage of air during pouring, and as will hereinafter more fully appear.

The coffee-grounds-container 18 is adapted to be engaged in the water container for vertical movement therein, and comprises an upper cylindrical portion 19 preferably of the same diameter as the upper end of the water container, an intermediate double taper sealing ring mounting portion consisting of an upper portion 20 connected to the portion 19 by an annular shoulder 21 and tapered downwardly and inwardly and a lower portion 22 tapered downwardly and outwardly, an annular locking groove 23 being formed between the tapered portions 20 and 22. The lower portion 24 of the coffee-grounds-container is of cylindrical shape, an annular locking groove 25 being formed between the upper end of this portion and the lower end of the tapered portion 22. The base 26 of the coffee-grounds-container is preferably slightly dished towards the center and is provided with centrally disclosed downwardly depending funnel 27.

An elastic and resilient sealing ring 28, preferably formed of rubber and of circular cross-section is carried upon the coffee-grounds-container in relation to have rolling movement between a non-sealing position coincident with the groove 23 and a sealing position upon the tapered portion 20 in spaced relation to said groove. The taper of the portion 20 normally tends to retain the ring in its position contiguous to the groove 23.

The diameter of the inner surface of the contacted portion 11 of the water container in relation to the outer diameter of the sealing ring in its lower position at the base of the tapered portion 20, as indicated in Fig. 1, is such that upon insertion of the coffee-grounds-container in the water container the sealing ring will rest upon the shoulder 12 to support the coffee-grounds-container in its raised position, and in this position it will be observed that the ring is above the pouring openings 13. In order to bring the coffee-grounds-container to its lower position it is simply pressed downwardly from the position shown in Fig. 1, whereupon the sealing ring 23 rolls upon the surfaces of the portions 11 and 20, and due to the taper of the portion 20 the ring is placed under compression in the lower position as indicated in Fig. 5. In this lower position the ring is disposed below the pouring openings 13 so that the interior of the water container is effectually sealed.

The parts are adapted to be secured in both the raised and lowered position, and for this purpose the portion 11 of the water container is provided near its lower end and at the handle side of the container with an aperture 29 in which there is secured a shouldered and exteriorly threaded tubular bushing 30 riveted over upon the interior of the container, as at 31.

A cup shaped casing 32 interiorly threaded at its inner end is screwed upon the bushing 30, providing a cylindrical chamber in which a plunger 33 is adapted to slide, the stem 33ª of the plunger extending through a passage 34 in the end of the casing 32 and being provided with a finger grip handle 35. The bushing 30 is provided with a tapered seat 36 against which a rubber ring 37 carried in a groove 38 in the plunger 33 is pressed by means of a helical spring 39 disposed upon the stem 33ª between the plunger and the end of the casing 32. A locking finger portion 40 provided upon the inner end of the plunger extends in spaced relation through the opening in the bushing 30 and is adapted to engage one or the other of the grooves 23 and 25 to secure the coffee grounds container in its two positions. The engaging end of the finger is preferably flat so that it will engage the surface of the groove with surface contact. Air-vent openings 41 are provided in the casing 32 at a point outwardly of the plunger in its inwardly pressed position. It will be observed that in this inwardly pressed position an air tight seal is provided by engagement of the rubber ring with the tapered seat. Upon pulling outwardly upon the plunger to release the coffee-grounds-container the plunger moves to a point outwardly of the air inlets 41 and permits air to pass through the bushing into the water container. The purpose of admitting air is to relieve the partial vacuum created within the water container, which would otherwise tend to exert a holding force upon the coffee-grounds-container. Upon admitting air the coffee-grounds-container will therefore move to its upper position with very little effort, and as will hereinafter more fully appear.

A cover 42 is provided upon the coffee-grounds-container 18, and is preferably retained by a bayonet joint formed by providing diametrically opposed grooves 43 in the flange of the cover which engage indented bosses 44 in the coffee-grounds-container. As will be obvious the cover is adapted to be locked and unlocked by a slight rotation. A handle 45 is secured to the cover and is preferably of arched or bail type, and an opening 46 is provided within the space between the sides of the handle, in which a transparent closure 47, preferably formed of heat-proof glass, is removably secured. A suitable construction for securing this glass closure consists in providing bosses 48 upon the flange of the closure which are engaged in notches 49 (Fig. 6) formed in a flange 50 bent downwardly from the edge of the opening 46, the bosses being first engaged in the notches and then turned to a point beneath the flange. Inasmuch as the upper end of the water container is of substantially the same diameter as the upper end of the coffee-grounds-container the cover 42 may be used upon the water container if it is desired to remove the coffee-grounds-container after the coffee is made.

A perforated drainer 51, of concavo-convex form and preferably made of a non-corrosive material, as stainless steel, is seated in the coffee-grounds-container over the upper end of the funnel 27. A stem 52 having a ring shaped finger engaging handle 53 at its upper end is secured centrally to the drainer, being provided near its lower end with a shoulder 54 which abuts the upper side of the drainer, the lower end of the stem being headed over at the under side, as at 55. A spring retaining clip 56 is also secured to the drainer by means of the head over end 55. This clip is preferably of inverted U-shape provided near the lower ends of its side legs with arcuately bent portions 57 adapted to snap into place over an annular projection 58 pressed into the funnel near its upper end, and which thus secures the drainer in place.

A sheet of filter material 59, preferably of filter paper, is adapted to be placed over the drainer 51, and for this purpose is provided with a central aperture 60, adapted to engage about the shoulder 54, and a slit 61 adapted to be passed over the ring handle 53. A perforated concavo-convex retaining plate 62 is adapted to be placed over the filter to hold it in place, being provided with a central aperture 63 for engaging about the shoulder 54 and diametrically disposed slots 64 adapted to pass over the ring handle 63 and which engage a cross pin 65 provided in the shoulder 64, the plate being retained by turning the same so that the cross pin is disposed out of register with the slot 64. The diameter of both the drainer 51 and retaining plate 62 is such that their edges are annularly spaced from the side wall of the coffee-grounds-container, and the diameter of the filter sheet 59 is somewhat larger so that a projecting marginal portion of the filter material engages directly upon the base of the coffee-grounds-container to more effectually prevent any sediment from passing into the water container.

In Fig. 7, I have illustrated a modified form of drainer and filter, in which the filter consists of a piece of very fine mesh cloth 66 engaged over the drainer 51 at its upper side and carried about its edge to the under side, where it is secured by a draw-string 67.

In Fig. 8, I have shown a further modified form of drainer and filter, in which the filter means consists of very closely woven wire mesh or gauze 68 disposed at the upper side of the drainer 51 and secured thereto by a retaining rim 69 bent over upon the under side of the drainer and upon the upper side of the wire mesh.

The operation is as follows:—The required quantity of water is placed in the lower container up to a level preferably below the bottom of the upper coffee-grounds-container in the raised position of the latter as indicated in Fig. 1. Ground coffee is placed in the coffee-grounds-container and the parts are engaged, the sealing ring being in its position coinciding with the groove 23 of the coffee-grounds-container and resting upon the shoulder 12 of the water container. The water may be at a temperature close to boiling when it is placed in the water container 10, or it can be entirely heated within the container. With the parts in position as shown in Fig. 1 heat is applied until the water reaches the boiling point, whereupon steam will issue through the pouring openings 13 indicating that this point has been reached.

Thereupon the plunger retaining finger 40 is pulled out of engagement with the groove 25 by pulling outwardly upon the finger grip 35 to thus release the coffee-grounds-container. The same is then pressed downwardly to the sealing position, shown in Fig. 5, in which position the plunger finger 40 engages the groove 23 to retain the parts in this position. During the downward movement of the coffee-grounds-container the sealing ring 28 rolls downwardly upon the surface 11 and upwardly upon the tapered surface 20 to a point below the pouring openings 13, and in this relation is compressed between the two containers to form an air-tight seal. The water is maintained at boiling temperature in the sealed position and consequently pressure is produced within the sealed space above the surface of the water and forces the water upwardly through the funnel 27 and through the drainer and filter into the upper container. Obviously the small quantity of water below the lower end of the funnel will not pass into the upper container, and as long as heat is applied this will continue to boil and the pressure will be maintained, so that the water that has been forced into the upper container remains there in contact with the coffee grounds, its temperature being slightly less than boiling temperature due to its removal from direct relation with the heating element.

After the water has remained in contact with the coffee grounds a sufficient length of time the heat is discontinued, whereupon the pressure is reduced and the coffee solution flows through the drainer and the funnel into the lower container, being forcibly and rapidly drawn therein through the suction produced by the partial vacuum created upon reduction of the temperature.

When all of the coffee solution has been passed from the upper container to the lower container the same is ready for use and thereupon the retaining plunger is pulled outwardly by means of the finger grip 35, simultaneously releasing the upper container and admitting air into the water container to relieve the partial vacuum therein. Due to the taper of the portion 20 and the tendency of the compressed sealing ring 28 when released to roll toward the contracted end the upper container will through this action of the ring be automatically raised to its upper position.

In this upper position the retaining plunger is engaged in the groove 25 and the coffee-grounds-container is centralized by its engagement with the projections 16 at the opposed side, so that a space is provided entirely about the coffee grounds container to permit the coffee solution to be poured. In pouring a small amount of air will be admitted past the ring through the air-vent recesses 17.

The sealing ring may either be formed from a length of rubber of cylindrical cross-section having its ends brought together and vulcanized, or it may be molded in ring form. In this latter case the diameter of the cross-section will be such that in moving the coffee-grounds-container from its upper to its lower position, and vice versa, the ring will roll one complete turn, so that in both the raised and lowered positions the natural position which the ring will tend to take will be coincident with the upper and lower positions of the coffee-grounds-container.

In Fig. 9, I have illustrated a modified form of the invention in which separate means are provided for admitting air to the water container and for locking the coffee-grounds-container in its operative positions. The water container 70 is substantially similar to the water container shown in the first embodiment and comprises a contracted cylindrical band portion 71 in spaced relation below the upper edge and providing an annular shoulder 72 between the upper end of the band portion and the upper portion of the container. The handle 73 is secured to the container in any suitable manner, and its upper portion 74 is horizontally arranged and is provided with a passage therein in which a plunger 76 is slidably mounted, the forward locking end 77 of which is preferably in the form of a flattened groove engaging finger projecting through an aperture 78 in the container. A helical spring 79 is disposed between the rear end of the plunger and the end of the passage 75 and normally presses the plunger inwardly. A trigger like finger engaging actuating member 80 is secured to the plunger and projects through a slot 81 in the under side of the portion 74 of the handle. The engagement of this finger with the end of the slot limits the projection of the plunger and the plunger is adapted to be retracted by pulling with the finger upon the portion 80.

The means for admitting air to the water container comprises a shouldered exteriorly threaded bushing 82 secured in an aperture 83 in the water container and riveted over upon the inner side thereof, the passage through the bushing being beveled at its outer end, as at 84. A cap member 85 is rotatably screwed upon the bushing and is provided interiorly with a plug 86 adapted to engage tightly upon the beveled surface 84 in the inwardly turned position of the cap to thus seal the water container. Air-vent holes 87 are provided in the cap outwardly of the bushing, and in the outwardly screwed position of the cap admit air to the water container.

The coffee-grounds-container consists of a cylindrical upper portion 88 of substantially the same diameter as the upper portion of the water container, a cylindrical intermediate portion 89 provided at its respective upper and lower ends with annular locking grooves 90 and 91 adapted to be engaged by the locking finger 77 of the plunger 76 in the respective lowered and raised positions of the coffee-grounds-container, and a lower double tapered portion including an upper tapered part 92 tapered downwardly and inwardly and a lower tapered part 93 tapered downwardly and outwardly. An elastic and resilient sealing ring 94 is provided upon the tapered portion and is adapted to occupy a position at the junction of the two tapered portions 92 and 93 in the raised and unsealed position of the coffee-grounds-container, the ring also resting upon the annular shoulder 72 of the water container in this position. In the lowered position the ring rolls upon the surfaces 92 and 71 and is compressed through the pressure of the tapered portion 92, as shown in the illustration.

The pouring spout in this embodiment is similar to that shown in the first embodiment, the pouring openings being arranged in the contracted band portion 71, so that the ring moves to a position above the pouring openings in the raised relation of the coffee-grounds-container and into a position below the pouring openings in the lower position of the coffee-grounds-container.

The operation is substantially similar to the first embodiment, except that the locking means is actuated independently of the air-vent means. In the lower operative position the air-vent means is closed, so that pressure will be created in the water container at the beginning of the coffee making operation and a partial vacuum will be produced upon reducing the temperature at the completion of the operation. When the coffee has flowed into the lower water container the air vent means is open to relieve the partial vacuum, whereupon the plunger 76 is retracted to permit the coffee-grounds-container to move to its upper position where it is adapted to be held by engagement of the plunger 76 in the annular locking groove 91.

In Fig. 10, I have illustrated a further modified form of the invention in which the coffee-grounds-container is adapted to remain in its lower operative position after completion of the coffee making operation. The water container is substantially similar to that shown in Fig. 9, and includes a cylindrical contracted band portion 95 having an annular shoulder 96 at its upper end, and a handle 97 provided with a locking plunger 98 similar in construction and operation to that shown in Fig. 9. The pouring spout 99 and the pouring openings 100 are arranged below the lower or sealing position of the sealing ring and a removable sealing cap 101 is screwed into the end of the pouring spout. When this cap is in place the interior of the water container is rendered air-tight. Air is admitted thereto upon removal of the cap.

The coffee-grounds-container comprises an upper portion 102 of substantially the same diameter as the upper end of the water container, and annular locking groove 103 in spaced relation below the portion 102 adapted to be engaged by the plunger 98 in the lower operative position, an intermediate doubled tapered portion including an upper part 104 tapered downwardly and inwardly and a lower part 105 tapered downwardly and outwardly, and a cylindrical bottom portion 106. The sealing ring 107 is disposed upon the tapered portion 104 and when the coffee-grounds-container is removed occupies a position at the base of this tapered portion.

In operation the coffee-grounds-container is pressed to its lower position as shown in the drawings, the sealing ring rolling upon the surfaces 104 and 95 and being compressed to seal the water container, and the coffee-grounds-container being retained in this relation by engagement of the plunger 98 in the groove 103. The cap 101 is placed upon the spout to render the water container air-tight, and thereupon the operation is similar to that of the other forms of the invention. When the coffee is completed the sealing cap 101 is removed and the coffee may then be poured in a substantially similar manner to an ordinary coffee pot.

Figure 11:
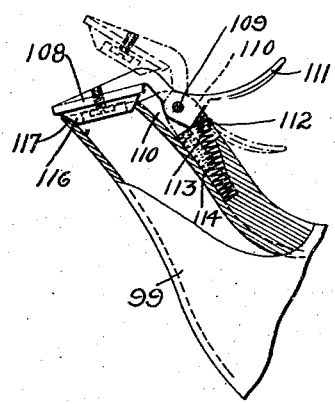
Fig. 11 is a fragmentary view, partially broken away, of a modified form of valve means, adapted to be employed in connection with the type of apparatus as shown in Fig. 10, the full lines showing the closed position and the dotted lines showing the open position.

In Fig. 11, I have shown a modified form of sealing means for the spout 99 comprising a cap 108 hinged at 109 upon a projection 110 formed upon the spout and provided with a finger engaging projection 111. A spring 112 is disposed between a lug 113 formed upon the cap and a lug 114 formed upon the spout and is adapted to have a toggle action, being so arranged that in the open position of the cap the line of spring pressure is at one side of the pivotal axes and in the closed position is at the other side of the pivotal axes, the cap moving into its open and closed positions with a snap action as the pressure line of the spring moves over dead center. The cap is preferably provided with a tapered preferably resilient facing 116 adapted to tightly engage a beveled seating portion 117 formed upon the end of the spout.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:—

1. In a coffee making or similar apparatus, a fluid container having an upright side wall, a coffee container adapted to be engaged therewith and having an upright side wall, fluid conducting means communicating with said coffee container and extending into said fluid container, a sealing ring interposed between the upright side walls of said containers, and means whereby said ring forms air-tight contact with said containers as they are relatively moved into operative relation.

2. In a coffee making or similar apparatus, a fluid container having an upright side wall, a coffee container adapted to be engaged therewith and having an upright side wall, fluid conducting means communicating with said coffee container and extending into said fluid container, a sealing ring interposed between the upright side walls of said containers, and means whereby said ring is compressed as the containers are relatively moved into operative relation.

3. In a coffee making or similar apparatus, a fluid container having an upright side wall, a coffee container adapted to be engaged therewith and having an upright side wall, fluid conducting means communicating with said coffee container and extending into said fluid container, a sealing ring interposed between the upright side walls of said containers, and means whereby said ring is moved relatively to said containers and forms an air-tight contact with said containers as they are relatively moved into operative relation.

4. In a coffee making or similar apparatus, a fluid container having a pouring opening, a coffee container adapted to be engaged therewith, fluid conducting means communicating with said coffee container and extending into said fluid container, a sealing ring interposed between said containers, and means whereby said ring is moved relatively to said containers from a point above said pouring opening to a point below said pouring opening as the containers are engaged in operative relation, and forms an air-tight contact with said containers in said position below said pouring opening.

5. In a coffee making or similar apparatus, a fluid container, a coffee container adapted to be engaged therewith, fluid conducting means communicating with said coffee container and extending into said fluid container, a sealing ring interposed between said containers, means whereby said ring forms air-tight contact with said containers as they are relatively moved into operative relation, and means for admitting and shutting off air to said fluid container at a point below said sealing ring.

6. In a coffee making or similar apparatus, a fluid container, a coffee container adapted to be engaged therewith, fluid conducting means communicating with said coffee container and extending into said fluid container, a sealing ring interposed between said containers, and means whereby said ring is bodily rolled relatively to said containers and forms an air-tight contact with the containers as they are engaged in operative relation.

7. In a coffee making or similar apparatus, a fluid container, a coffee container adapted to be engaged therewith, fluid conducting means communicating with said coffee container and extending into said fluid container, a sealing ring interposed between said containers, and means whereby said ring is bodily rolled relatively to said containers and compressed as the containers are engaged in operative relation.

8. In a coffee making or similar apparatus, a fluid container having an upright side wall, a coffee container adapted to be engaged therewith and having an upright side wall, fluid conducting means communicating with said coffee container and extending into said fluid container, said containers being movable relatively to each other between a non-sealing position and a sealing position, and sealing means cooperating between said side walls of said containers and adapted through said relative movement to seal said fluid container in said sealing position.

9. In a coffee making or similar apparatus, a fluid container, a coffee container adapted to be engaged therewith, fluid conducting means communicating with said coffee container and extending into said fluid container, said containers being movable relatively to each other between a non-sealing position and a sealing position, sealing means cooperating between said containers and adapted through said relative movement to seal said fluid container in said sealing position, and means for admitting and shutting off air to said fluid container in said sealing position.

10. In a coffee making or similar apparatus, a fluid container having a pouring opening below its upper edge, a coffee container adapted to be engaged therewith, fluid conducting means communicating with said coffee container and extending into said fluid container, said containers being movable relatively to each other between a non-sealing position and a sealing position, and sealing means cooperating between said containers and adapted to seal said fluid container in said sealing position and at a point below said pouring opening.

11. In a coffee making or similar apparatus, a fluid container, having a pouring opening below its upper edge, a coffee container adapted to be engaged therewith, fluid conducting means communicating with said coffee container and extending into said fluid container, said containers being movable relatively to each other to a sealing position, sealing means cooperating between said containers and adapted to seal said fluid container in said sealing position, and means associated with said pouring opening for admitting and shutting off air therethrough to said fluid container.

12. In a coffee making or similar apparatus, a fluid container, a coffee container adapted to be engaged therewith, fluid conducting means communicating with said coffee container and extending into said fluid container, said containers being movable relatively to each other to a sealing position, sealing means cooperating between said containers and adapted to seal said fluid containers in said sealing position, and locking means for releasably retaining said containers in said sealing position.

13. In a coffee making or similar apparatus, a fluid container, a coffee container adapted to be engaged therewith, fluid conducting means communicating with said coffee container and extending into said fluid container, said containers being movable relatively to each other between a non-sealing position and a sealing position, sealing means cooperating between said containers and adapted to seal said fluid container in said sealing position, and locking means for releasably retaining said containers in said respective sealing and non-sealing positions.

14. In a coffee making or similar apparatus, a fluid container, a coffee container adapted to be engaged therewith, fluid conducting means communicating with said coffee container and extending into said fluid container, said containers being movable relatively to each other between a non-sealing position and a sealing position, sealing means cooperating between said containers and adapted to seal said fluid container in said sealing position, locking means for releasably retaining said containers in said respective sealing and non-sealing positions, and means for admitting and shutting off air to said fluid container in said sealing position.

15. In a coffee making or similar apparatus, a fluid container, a coffee container adapted to be engaged therewith, fluid conducting means communicating with said coffee container and extending into said fluid container, said containers being movable relatively to each other between a non-sealing position and a sealing position, sealing means cooperating between said containers and adapted to seal said fluid container in said sealing position, means for releasably retaining said containers in said respective sealing and non-sealing positions, and means cooperatively actuated by said releasable retaining means for admitting and shutting off air to said fluid container in said sealing position respectively as said means is actuated to release and retain said containers.

16. In a coffee making or similar apparatus, a fluid container, a coffee container adapted to be engaged therewith, fluid conducting means communicating with said coffee container and extending into said fluid container, said containers being vertically movable relatively to each other to a sealing position, sealing means cooperating between said containers and adapted to seal said fluid container in said sealing position, said coffee container having an abutment, and means carried by said water container for releasably engaging said abutment to retain said container in said sealing position.

17. In a coffee making or similar apparatus, a fluid container, a coffee container adapted to be engaged therewith, fluid conducting means communicating with said coffee container and extending into said fluid container, said containers being vertically movable relatively to each other to a sealing position, sealing means cooperating between said containers and adapted to seal said fluid container in said sealing position, said coffee container having an annular abutment, and retractable means carried by said fluid container adapted to be engaged and disengaged with said annular abutment to retain said containers in said sealing position.

18. In a coffee making or similar apparatus, a fluid container, a coffee container adapted to be engaged therewith, fluid conducting means communicating with said coffee container and extending into said fluid container, said containers being vertically movable relatively to each other between a non-sealing position and a sealing position, sealing means cooperating between said containers and adapted to seal said fluid container in said sealing position, said coffee container having a pair of spaced abutments and means carried by said water container for releasably engaging said respective abutments to retain said containers in said non-sealing and sealing positions.

19. In a coffee making or similar apparatus, a fluid container having an upright side wall and an open upper end, a coffee container having an upright side wall and a base adapted to be engaged in said open upper end of the fluid container below the upper edge thereof, a funnel connected to the center of said coffee container and extending into said fluid container, the bottom of said coffee container being disposed between said funnel and the wall of said fluid container, said containers being movable relatively to each other between a non-sealing position and a sealing position, and sealing means cooperating between said side walls of said containers and adapted to seal said fluid container in said sealing position.

20. In a coffee making or similar apparatus, a fluid container, a coffee container adapted to be engaged therewith, fluid conducting means communicating with said coffee container and extending into said fluid container, one of said containers having an annular sealing ring mounting portion, and the other of said containers having an annular sealing ring engaging portion, and a sealing ring arranged to move upwardly and downwardly on said sealing ring mounting portion through contact with said sealing ring engaging portion as the containers are engaged with each other.

21. In a coffee making or similar apparatus, a fluid container, a coffee container adapted to be engaged therewith, fluid conducting means communicating with said coffee container and extending into said fluid container, one of said containers having an annular sealing ring mounting portion, and the other of said containers having an annular sealing ring engaging portion, and a sealing ring arranged to roll upwardly and downwardly on said sealing ring mounting portion through contact with said sealing ring engaging portion as the containers are engaged with each other.

22. In a coffee making or similar apparatus, a fluid container, a coffee container adapted to be engaged therewith, fluid conducting means communicating with said coffee container and extending into said fluid container, one of said containers having an annular sealing ring mounting portion, and the other of said containers having an annular sealing ring engaging portion, and a sealing ring arranged to move upwardly and downwardly on said sealing ring mounting portion through contact with said sealing ring engaging portion as the containers are engaged with each other, one of said portions being tapered whereby the ring is compressed in one of its positions.

23. In a coffee making or similar apparatus, a fluid container, a coffee container adapted to be engaged therewith, fluid conducting means communicating with said coffee container and extending into said fluid container, one of said containers having an annular sealing ring mounting portion, and the other of said containers having an annular sealing ring engaging portion, and a sealing ring of circular cross-section arranged to roll upwardly and downwardly on said sealing ring mounting portion through contact with said sealing ring engaging portion as the containers are engaged with each other, one of said portions being tapered whereby the ring is compressed in one of its positions.

24. In a coffee making or similar apparatus, a fluid container, a coffee container adapted to be engaged therewith, fluid conducting means communicating with said coffee container and extending into said fluid container, said coffee container having an annular sealing ring mounting portion, and said water container having an annular sealing ring engaging portion, and a sealing ring arranged to roll upwardly and downwardly on said sealing ring mounting portion through contact with said sealing ring engaging portion as the containers are engaged with each other, said sealing ring mounting portion being tapered whereby the ring is compressed in one of its positions, said coffee container having a tapered portion tapered outwardly from the contracted end of said tapered sealing ring mounting portion.

25. In a coffee making or similar apparatus, a fluid container, a coffee container adapted to be engaged therewith, fluid conducting means communicating with said coffee container and extending into said fluid container, said coffee container having an annular sealing ring mounting portion, and said water container having an annular sealing ring engaging portion, and a sealing ring arranged to roll upwardly and downwardly on said sealing ring mounting portion through contact with said sealing ring engaging portion as the containers are engaged with each other, said sealing ring mounting portion being tapered whereby the ring is compressed in one of its positions, said coffee container having a tapered portion tapered outwardly from the contracted end of said tapered sealing ring mounting portion, abutment means between said tapered portions, and means carried by said water container adapted to be engaged with said abutment means for releasably retaining said containers.

26. In a coffee making or similar apparatus, a fluid container, a coffee container adapted to be engaged therewith, fluid conducting means communicating with said coffee container and extending into said fluid container, said coffee container having an annular sealing ring mounting portion, and said fluid container having an annular sealing ring engaging portion, a sealing ring disposed about said sealing ring mounting portion and arranged to roll upwardly and downwardly thereon through contact with said sealing ring engaging portion as the containers are engaged with each other, said sealing ring mounting portion being tapered whereby the ring is compressed in one of its positions and tends to roll toward its other position when released, and means for releasably retaining said containers in said compressed position of the sealing ring.

27. In a coffee making or similar apparatus, a fluid container, a coffee container adapted to be engaged therewith, fluid conducting means communicating with said coffee container and extending into said fluid container, said coffee container having an annular sealing ring mounting portion, and said fluid container having an annular sealing ring engaging portion, a sealing ring of circular cross-section disposed about said sealing ring mounting portion and arranged to roll upwardly and downwardly thereon through contact with said sealing ring engaging portion as the containers are engaged with each other, said sealing ring mounting portion being tapered whereby the ring is compressed in one of its positions and tends to roll toward its other position when released, and means for releasably retaining said container in both of said positions of the sealing ring.

28. In a coffee making or similar apparatus, a fluid container, a coffee container adapted to be engaged therewith, and moved vertically between a non-sealing and a sealing position, fluid conducting means communicating with said coffee container and extending into said fluid container, one of said containers having an annular sealing ring mounting portion, and the other of said containers having an annular sealing ring engaging portion including an annular laterally extending shouldered portion of greater diameter than said ring and an annular axially extending portion of smaller diameter than said ring, and a sealing ring arranged to roll upwardly and downwardly on said sealing ring mounting portion through contact with said annular axially extending portion of said sealing ring engaging portion as the containers are moved to said sealing position, said ring adapted to rest upon said annular shouldered portion in said non-sealing position.

29. In a coffee making or similar apparatus, a fluid container, a removable coffee container adapted to be engaged in a predetermined fixed relation within said fluid container, fluid conducting means communicating with said coffee container and extending into said fluid container, and means adapted to be operated to seal and unseal the interior of said fluid container in said predetermined fixed relation of said coffee container and arranged that fluid in said fluid container will boil indefinitely without creating pressure in the unsealed relation of said means and will create pressure in the sealed relation to force the fluid into said coffee container.

30. In a coffee making or similar apparatus, a fluid container, a coffee container adapted to be removably engaged therewith, fluid conducting means communicating with said coffee container and extending into said fluid container, a handle on said fluid container, means in association with said handle adapted to be actuated to secure said coffee container in a given relation to said fluid container, a cover adapted to be removably secured to said coffee container, and a handle on said cover for removing said coffee container from said fluid container.

31. In a coffee making or similar apparatus, a fluid container, a coffee container adapted to be removably engaged therewith, the upper ends of said fluid and coffee containers being of corresponding interior diameters, fluid conducting means communicating with said coffee container and extending into said fluid container, a handle on said fluid container, means adapted to removably secure said coffee container in a given relation to said fluid container, a cover adapted to be removably secured to said coffee container, interlocking means cooperating between said cover and said coffee container to removably secure them together, and a handle on said cover for removing said coffee container from said fluid container, said cover having an exterior diameter adapted to snugly fit within the interior diameters of the upper ends of said coffee and fluid containers and adapted upon removal from said coffee container to be fitted within said fluid container.

32. In a coffee making or similar apparatus, a fluid container, a coffee container adapted to be engaged therewith, fluid conducting means communicating with said coffee container and extending into said fluid container, said containers being vertically movable relatively to each other between a non-sealing position and a sealing position, sealing means cooperating between said containers and adapted to seal said fluid containers in said sealing position, said coffee container having a pair of spaced abutments above said sealing means, and means carried by said water container for releasably engaging said respective abutments to retain said containers in said non-sealing and sealing positions.

33. In a coffee making or similar apparatus, a fluid container, a coffee container adapted to be engaged therewith, fluid conducting means communicating with said coffee container and extending into said fluid container, said containers being vertically movable relatively to each other between a non-sealing position and a sealing position, sealing means cooperating between said containers and adapted to seal said fluid container in said sealing position, said coffee container having a pair of spaced abutments below said sealing means, and means carried by said water container for releasably engaging said respective abutments to retain said containers in said non-sealing and sealing positions.

BORIS BOGOSLOWSKY.